United States Patent [19]

Schlicker

[11] Patent Number: 4,469,333
[45] Date of Patent: Sep. 4, 1984

[54] SEALING DEVICE IN A TRANSMISSION WITH PRESSURE-MEDIUM CONTROLLED, CONTINUOUSLY VARIABLE GEAR RATIO

[75] Inventor: Heinrich A. Schlicker, Bengtsfors, Sweden

[73] Assignee: AB Volvo, Gothenburg, Sweden

[21] Appl. No.: 442,796

[22] Filed: Nov. 18, 1982

[30] Foreign Application Priority Data

Nov. 24, 1981 [SE] Sweden ................................ 8106981

[51] Int. Cl.³ ............................................. F16L 27/08
[52] U.S. Cl. ................................ 277/12; 277/DIG. 8; 474/28
[58] Field of Search .................. 474/28, 18; 277/1, 12, 277/53, DIG. 8

[56] References Cited

U.S. PATENT DOCUMENTS

| 3,081,642 | 3/1963 | Emerson | 474/28 |
| 3,129,960 | 4/1964 | Schrodt | 277/53 |
| 3,403,567 | 10/1968 | Bruet | 474/28 |
| 3,704,634 | 12/1972 | Schrodt | 474/18 |
| 4,327,586 | 5/1982 | Goddard | 277/12 |

FOREIGN PATENT DOCUMENTS

| 1454479 | 8/1965 | France . | |
| 2065798 | 12/1979 | United Kingdom | 277/DIG. 8 |
| 2110332 | 6/1983 | United Kingdom | 474/28 |

Primary Examiner—Robert I. Smith
Attorney, Agent, or Firm—Young & Thompson

[57] ABSTRACT

A sealing device in a transmission with pressure-medium controlled, continuously variable gear ratio for sealing a pressure medium connection between a channel in the transmission housing and a central, axial bore in a pulley shaft rotating in the housing consists of two concentric sleeves with slide surfaces of fine surface finish. One end of the inner sleeve is pressed into the housing channel and is sealed against its wall by means of a sealing ring. The outer sleeve is divided into a shorter portion of large outer diameter with a longer portion of smaller outer diameter. The shorter portion is fitted into the shaft bore and is sealed against the wall of the bore with a sealing ring, there being a space between the wall of the bore and the longer portion.

6 Claims, 1 Drawing Figure

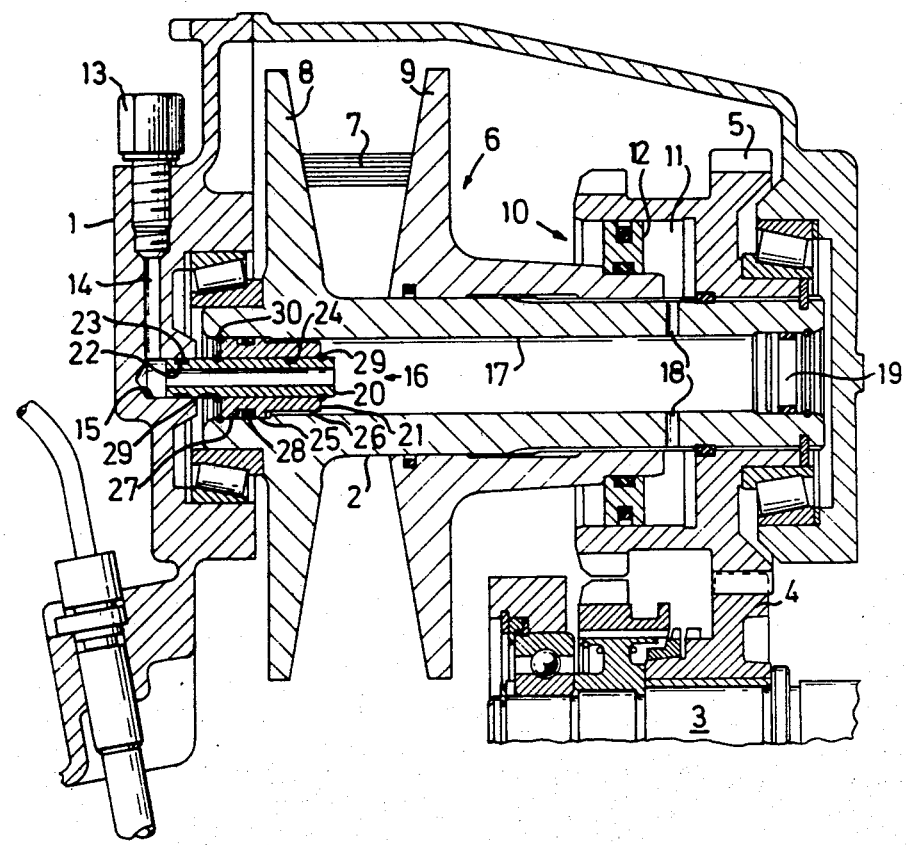

SEALING DEVICE IN A TRANSMISSION WITH PRESSURE-MEDIUM CONTROLLED, CONTINUOUSLY VARIABLE GEAR RATIO

The present invention relates to a sealing device, preferably in a transmission with pressure-medium controlled, continuously variable gear ratio for sealing a pressure medium connection between a channel in the transmission housing and a central, axial bore in a shaft rotatably journalled in the housing, e.g. a shaft carrying a pulley consisting of a pair of disc members, the spacing between them being variable by means of a piston-cylinder device which has a cylinder chamber communicating with the shaft bore, said sealing device comprising an inner sleeve extending into the house channel and into the shaft bore, and an outer sleeve slide-journalled on the inner sleeve and extending into the shaft bore.

In modern, continuously variable vehicle transmissions, in which relatively high torques can be transmitted by means of a V-belt or a chain between a pair of pulleys, hydraulic systems are used with advantage to control the gear ratio and the clamping force of the disc members against the belt or chain. These disc members are adjusted with the aid of a hydraulic cylinder arranged concentrically with the associated shaft. The piston of said cylinder is joined to one disc member and the cylinder chamber is supplied with hydraulic fluid via a bore in the shaft.

In this design, the hydraulic fluid must be led from a stationary portion to a rotating portion, i.e. from a channel in the transmission housing to the bore in the rotating shaft. This gives rise to problems in achieving a tight connection between the components, since we are dealing with very high fluid pressures—on the order of 100 bar (about 1500 psi)—and the shaft is also subjected to bending stresses by the pulling force in the belt or chain. Machining the shaft journal to very fine tolerances and allowing it to fit into an equally finely machined bore in the transmission housing involves high machining costs and is not sufficient to achieve a reliable seal. Even a very small bending of the shaft will result in the parts binding, which in turn results in heavy wear with consequent leakage. An additional disadvantage is that it is difficult to mount and remove the components without damaging the fine surface finish of the surfaces. The latter problem can of course be avoided by arranging in a known manner the surfaces rotating relative to each other on separate sleeves which are inserted into the house channel and the shaft bore, but this only solves one of the above-mentioned problems.

The purpose of the present invention is to achieve a sealing device of the type described in the introduction, which solves all of the above-mentioned problems.

This is achieved according to the invention by the outer sleeve having a guide portion which has a small play against the wall of the shaft bore and which has an axial extent substantially less than the length of the axial bore in said sleeve, in which bore the inner sleeve is journalled, and in that sealing rings are arranged between the shaft bore and the portion of the outer sleeve in contact therewith and between the channel in the housing and the portion of the inner sleeve extending into said channel.

By making the contact surface or guide surface of the outer sleeve against the shaft bore much shorter than the total length of the outer sleeve, the result at a certain bending deflection of the shaft will be that the central axes of the shaft and the sleeves will no longer fully coincide, which means that the sleeves will be less affected by the deflection of the shaft. The sealing device according to the invention thus functions as a sort of "link" between the housing and the shaft, the long slide surfaces or sealing surfaces of the sleeves assuring that the sealing function will be maintained even if the shaft is deflected.

The seal between the bore in the housing and the shaft bore respectively and the outside guide surfaces of the sleeves is made with O-rings in grooves in these surfaces, which means that the surfaces need not be made with fine tolerances or high surface finish nor will scratches or the like during assembly and disassembly affect the sealing function. The slide surfaces of the sleeves are never subjected to external damage, since the sleeves after machining of the slide surfaces to a fine surface finish and assembly can be fixed axially to each other with the aid of lock rings, so that they then only need to be handled as a unit.

The invention will now be described in more detail with reference to the example shown in the accompanying drawing, which shows a section through a portion of a transmission with the sealing device according to the invention.

In the FIGURE, 1 designates the transmission housing, in which a shaft 2 is rotatably journalled. The shaft 2 is driven by an input shaft 3 via gears 4,5 and carries a pulley 6 which via a V-belt or chain 7 drives a corresponding pulley on the output shaft (not shown). The pulley 6 consists of two disc members 8,9 of which member 8 is made in one piece with the shaft 2, while member 9 is displaceably but non-rotatably mounted on the shaft.

Concentric to the shaft 2 there is a hydraulic piston-cylinder arrangement 10 with a piston 12 which is joined to the disc member 9 and is displaceable in a cylinder chamber 11. In the FIGURE, 13 designates the connection to a pressure source which communicates with the cylinder chamber 11 via a channel 14 and a bore 15 in the housing 1, a sealing device according to the invention which is generally designated 16, a central bore 17 in the shaft 2 and radial bores 18 in the shaft 2. The bore 17 is closed by a sealing plug 19.

The sealing device 16 consists of a pair of concentrically arranged sleeves 20,21. One end of the inner sleeve 20 projects into the bore 15 with a portion, the outer lateral surface of which is made with a peripheral groove 22 containing an O-ring 23 which seals against the wall of the bore 15. The sleeve 20 is made with a very fine surface finish on its portion projecting into the bore 24 of the sleeve 21 and the bore 24 is made with a correspondingly fine surface finish. The sleeves are also made with a very precise fit, only leaving the required play to maintain a lubricating film of oil between the sleeves.

The outer sleeve 21 is divided into a portion 25 of larger diameter and a portion 26 of smaller diameter. The outer lateral surface of the portion 25 forms the guide surface against the wall of the shaft bore 17 and has a peripheral groove 27 with an O-ring 28 which seals against the wall of the bore. Between the portion 26, which is longer than the portion 25, and the wall of the bore 17, there is a space. The sleeves are fixed axially relative to each other with the aid of lock rings 29, in peripheral grooves in the inner sleeve 20 at either end of the outer sleeve. The inner sleeve in the example shown has the same cross-sectional area at both ends, which means that it will not be subjected to any axial forces and that the lock rings will consequently not need to be dimensioned to absorb any axial load. The unit composed of the sleeves is fixed axially in the shaft bore 17 by means of a lock ring 30 in a groove in the bore. When the lock ring 30 is removed, the sleeves can be taken out as a unit, which eliminates the risk of damage to the slide surfaces during disassembly and reassembly.

The sealing device according to the invention is designed for transmissions in which the oil of the hydraulic system can also be used as lubricating oil for the rotating parts of the transmission. This means that the small amount of oil, which leaks between the sleeves for the purpose of lubrication, will be returned to the suction side of the pump of the hydraulic system.

The sealing device according to the invention has been described above in connection with one of the pulley shafts of the transmission, but the other shaft (not shown) is also provided with a corresponding sealing device. The sealing device is however not limited to use in transmissions of the type described above, but can also be used in other types of transmissions where high pressure and similar loads create corresponding sealing problems which can be solved by using the sealing device according to the invention.

What I claim is:

1. Sealing device, preferably in a transmission with pressure-medium controlled, continuously variable gear ratio, for sealing a pressure medium connection between a channel in the transmission housing and a central, axial bore in a shaft rotatably journalled in the housing, e.g. a shaft carrying a pulley consisting of a pair of disc members, the spacing between them being variable by means of a piston-cylinder device which has a cylinder chamber communicating with the shaft bore, said sealing device comprising an inner sleeve extending into the house channel and into the shaft bore, and an outer sleeve slide-journalled on the inner sleeve and extending into the shaft bore, characterized in that the outer sleeve has a guide portion which has a small play against the wall of the shaft bore and which has an axial extent substantially less than the length of the axial bore in said sleeve, in which bore the inner sleeve is journalled, and in that sealing rings are arranged between the shaft bore and the portion of the outer sleeve in contact therewith, and between the channel in the housing and the portion of the inner sleeve extending into said channel.

2. Sealing device according to claim 1, characterized in that the outer sleeve is fixed axially on the inner sleeve, so that the sleeves can be mounted and removed as a unit in the transmission.

3. Sealing device according to claim 2, characterized in that the inner sleeve projects past both ends of the outer sleeve and has peripheral grooves with lock rings at both ends of the outer sleeve.

4. Sealing device according to claim 1, characterized in that the outer sleeve has a first guide portion projecting into the shaft bore and a second portion of smaller outer diameter than the first portion, there being a larger play between the surface of the second portion and the surrounding wall of the shaft bore than between the guide portion and the wall of the bore.

5. Sealing device according to claim 4, characterized in that the second portion is longer than the first portion.

6. Sealing device according to claim 1, characterized in that both ends of the inner sleeve have the same cross-sectional area.

* * * * *